United States Patent
Slattery

(10) Patent No.: US 6,755,705 B1
(45) Date of Patent: Jun. 29, 2004

(54) WATER DRAIN CONDUIT BETWEEN EXHAUST PIPE AND EXPANSION CHAMBER FOR A WATERCRAFT

(75) Inventor: Gordon Slattery, Osceola, WI (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 10/375,667

(22) Filed: Feb. 26, 2003

(51) Int. Cl.$^7$ .............................................. B63H 21/32
(52) U.S. Cl. .................... 440/89 J; 440/89 R
(58) Field of Search ............................ 440/89 R, 89 E, 440/89 I, 89 J

(56) References Cited

U.S. PATENT DOCUMENTS

| | | | |
|---|---|---|---|
| 4,019,456 A | * | 4/1977 | Harbert ..................... 440/88 R |
| 5,067,448 A | | 11/1991 | Nakase et al. |
| 5,234,364 A | | 8/1993 | Ito |
| 5,366,401 A | | 11/1994 | Nanami et al. |
| 5,536,189 A | | 7/1996 | Mineo |
| 6,010,378 A | | 1/2000 | Fujimoto et al. |
| 6,224,440 B1 | | 5/2001 | Shimizu |
| 6,491,557 B2 | | 12/2002 | Tamaki |
| 6,506,086 B2 | | 1/2003 | Matsumoto |

* cited by examiner

*Primary Examiner*—Ed Swinehart
(74) *Attorney, Agent, or Firm*—Natalie D. Kadievitch; Fredrikson & Byron, P.A.

(57) ABSTRACT

An exhaust system for a personal watercraft that includes a water drain conduit coupling the exhaust pipe to the expansion chamber. The water drain conduit is located at the lowest point of the exhaust pipe and expansion chamber.

24 Claims, 4 Drawing Sheets

WATER DRAIN CONDUIT BETWEEN EXHAUST PIPE AND EXPANSION CHAMBER FOR A WATERCRAFT

BACKGROUND OF THE INVENTION

This invention relates to a small watercraft such as a personal watercraft and, more particularly, to an improved exhaust system therefore.

FIELD OF THE INVENTION

Personal watercrafts are a popular type of watercraft in which one or more passengers ride on, rather than in, the watercraft.

Frequently, these watercrafts are sporting in nature, and the riders expect to leave the watercraft at times during its use and enter into the body of water in which the watercraft is operating.

Presently, one drawback of personal watercrafts is that unwanted noises are generated by the exhaust system upon the discharge of exhaust gases into the atmosphere. The conventional way of resolving this noise problem is to silence the exhaust noises by cooling the exhaust gases either through water jacketing the exhaust system or by dumping cooling water directly into the exhaust system and mixing the water with the exhaust gases. This water coolant is normally drawn from the body of water in which the watercraft is operating and then discharged back into the body of water along with the gases after being circulated through the exhaust system.

In a typical watercraft exhaust system, there is an exhaust manifold (often part of the engine itself) that discharges gas into an exhaust pipe. From the exhaust pipe, the gases move through an upwardly arched connector pipe or sleeve, an expansion chamber, another connector pipe, a resonator and then out of the watercraft. Generally, cooling water is introduced into the exhaust pipe to silence the noise generated from the exhaust gases. This water then moves along with the exhaust gases through the remainder of the exhaust system and is discharged.

The expansion chamber functions to trap the water to prevent it from flowing backwards into the engine. In many watercraft exhaust systems, the expansion chamber is normally positioned lower than the connector pipe connecting the exhaust pipe to the expansion chamber. In other words, this connector pipe is arched upward relative to the exhaust pipe and expansion chamber. Thus, once water reaches the expansion chamber, it is trapped and is difficult to flow backwards towards the engine.

One drawback with such a system is that since the connector sleeve following the exhaust pipe is arched upward, water often remains within the exhaust pipe and is often difficult to move forward. Typically, this water must be blown out of the exhaust pipe when the driver increases the throttle, the initial power blowing both the exhaust gases and the water upward through the connector sleeve and into the expansion chamber. When the watercraft is at low idle, water will not be blown out of the exhaust pipe and will accumulate since there is not enough power to blow it upward through the connector sleeve.

For several reasons, it is undesirable to have water remaining within the exhaust pipe. For one, the remaining water slows down the process of starting up the watercraft. This is because the remaining water must first be blown out of the exhaust pipe before the watercraft can be started. The occupants of the watercraft will often note a sputtering delay in starting the watercraft. That is, the water will sputter out of the watercraft for a few seconds before the engine becomes started. Water remaining in the exhaust pipes may also lead to undesirable corrosion and obstruction.

Thus, there is a need for an improved exhaust system for a personal watercraft capable of more effectively channeling water from an exhaust pipe into an expansion chamber while still allowing the expansion chamber to retain its water trapping functions. There is also a need for an improved watercraft system capable of starting rapidly, without the sputtering delay due to water being blown out.

In addition, there is a need for an improved exhaust system for a personal watercraft that occupies less hull space and can be packaged in a compact configuration. Furthermore, there is a need for an exhaust system that maintains the level of power needed for successful operation of the personal watercraft and allows for backflow protection to the engine.

SUMMARY OF THE INVENTION

According to a first aspect of the invention, there is provided a drainage system for a watercraft vehicle. The system includes an exhaust pipe, an expansion chamber; a connector sleeve and a water drain conduit. The connector sleeve is located between the exhaust pipe and the exhaust chamber and has a proximal end coupled to a first output of the exhaust pipe and a distal end coupled to a first input of the expansion chamber. The water drain conduit is located between the exhaust pipe and the exhaust chamber and has a proximal end coupled to a second output of the exhaust pipe and a distal end coupled to a second input of the expansion chamber. The second input of the expansion chamber is located below the first input of the expansion chamber and the second output of the exhaust pipe is locate below the first output of the exhaust pipe.

According to another aspect of the invention, there is provided a drainage system for a water vehicle. The system includes an exhaust pipe, an expansion chamber and a connector sleeve. The connector sleeve is located between the exhaust pipe and the exhaust chamber and has a proximal end coupled to a first output of the exhaust pipe and a distal end coupled to a first input of the expansion chamber. Means are located between the exhaust pipe and the exhaust chamber for draining water from the exhaust pipe.

According to a third aspect of the invention, there is provided a personal watercraft having a hull defining an engine compartment, a jet propulsion unit, a top deck and an exhaust system located in the engine compartment. The exhaust system includes an exhaust pipe, an expansion chamber, a connector sleeve and a water drain conduit. The connector sleeve is located between the exhaust pipe and expansion chamber and has a proximal end coupled to a first output of the exhaust pipe and a distal end coupled to a first input of the expansion chamber. The water drain conduit is located between the exhaust pipe and expansion chamber and has a proximal end coupled to a second output of the exhaust pipe and a distal end coupled to a second input of the expansion chamber. The second input of the expansion chamber is located below the first input of the expansion chamber and the second output of the exhaust pipe is located below the first output of the exhaust pipe.

DETAILED DESCRIPTION OF THE PREFERRED EMBODIMENTS OF THE PRESENT INVENTION

Figure 1:
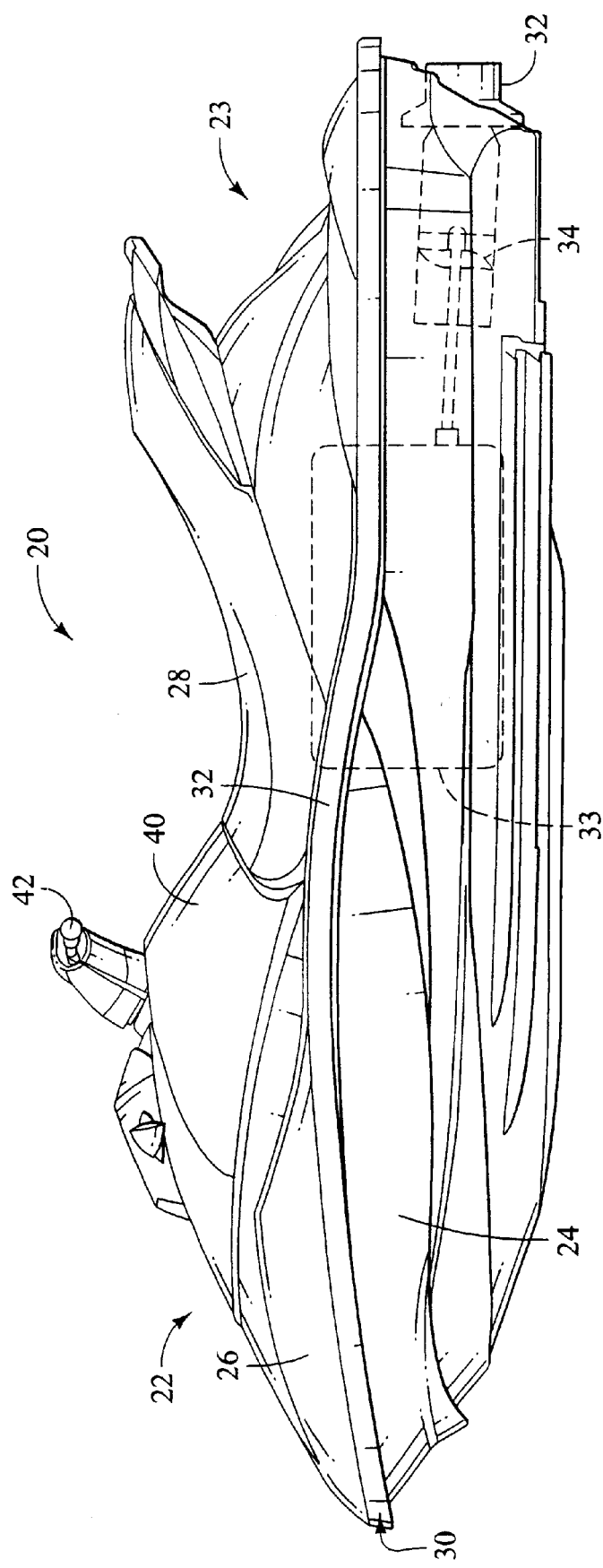
FIG. 1 is a perspective view of a personal watercraft.

The following detailed description should be read with reference to the drawings, in which like elements in different drawings are numbered identically. The drawings depict selected embodiments and are not intended to limit the scope of the invention. It will be understood that embodiments shown in the drawings and described above are merely for illustrative purposes, and are not intended to limit the scope of the invention as defined in the claims that follow.

FIG. 1 illustrates a personal watercraft 20 having generally a front or bow 22 and a rear or stern 23. The personal watercraft 20 includes a top deck 26 secured to a bottom hull 24 along an overlapping portion covered with a rub rail 30 in the embodiment illustrated, thereby forming a hull. The hull includes an exhaust opening 32. The hull formed by the bottom hull 24 and top deck 26 define a compartment sized to contain an internal combustion engine 33 for powering the watercraft, and may also include one or more storage compartments, depending upon the size and configuration of the watercraft. The deck portion 26 also has a raised, longitudinally extending seat 28 adapted to accommodate one or more riders seated in straddle fashion on the seat 28.

Engine 33 powers a jet propulsion unit 34, typically mounted in a tunnel at the bottom rear portion of the watercraft. Jet propulsion unit 34 includes a steerable water discharge nozzle (not shown) that is operatively connected to a set of handlebars 42 to facilitate steering of the watercraft by the operator. The engine 33 may be of the two or four cycle variety. Of course, the engine 33 may have as few as one, or more than two cylinders, as appreciated by those skilled in the art. In engines of the four-stroke variety, the engine 33 includes a lubricating system (not shown). The lubricating system includes an oil reservoir (not shown) that must be drained and refilled routinely. The hull 24 may be made of any suitable material including molded fiberglass, reinforced resin plastic, and/or a sheet of molding compound.

Figure 2:
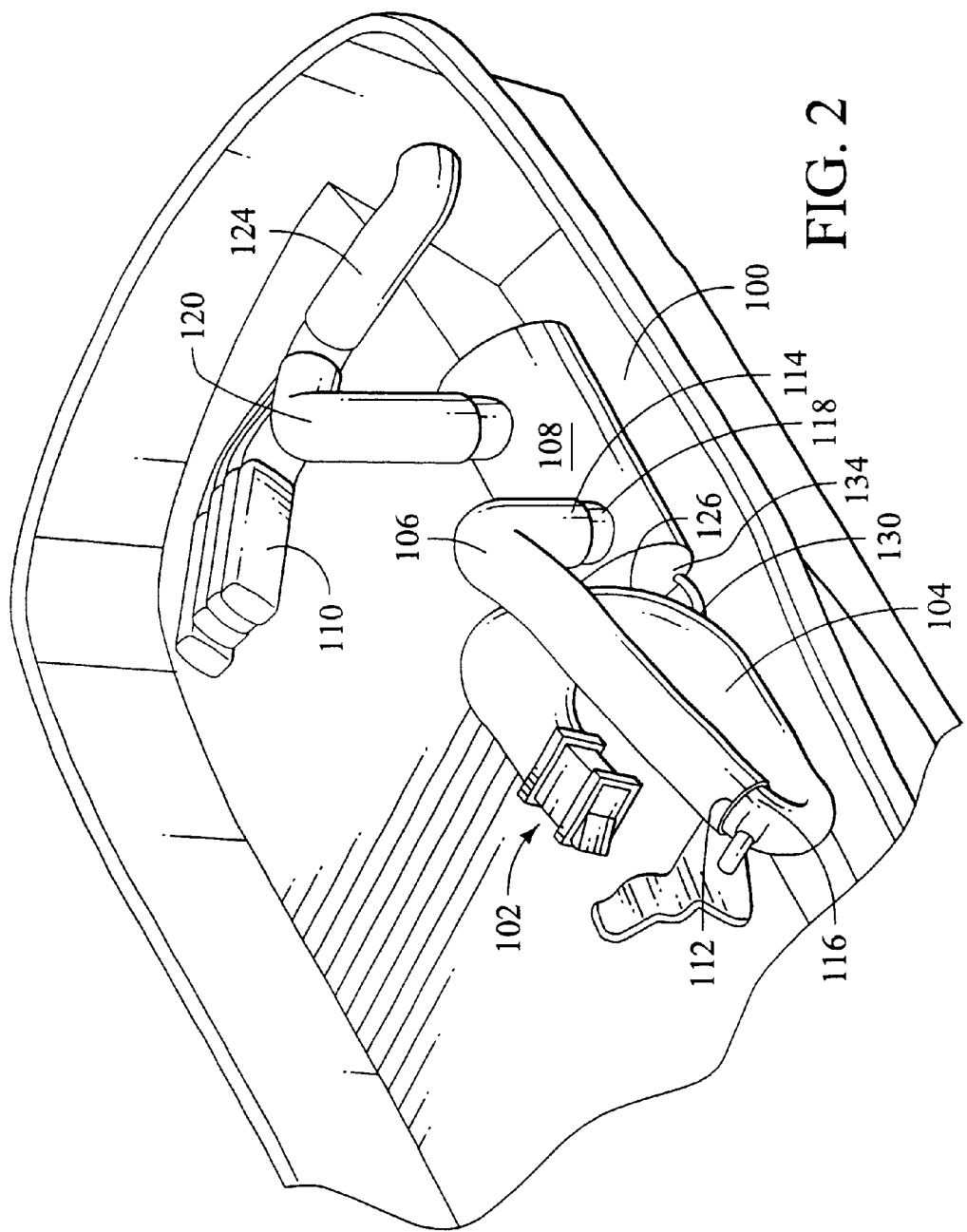
FIG. 2 is a perspective view of the exhaust system shown in the hull of a personal watercraft with the deck removed according to a preferred embodiment of the present invention.
Figure 3:
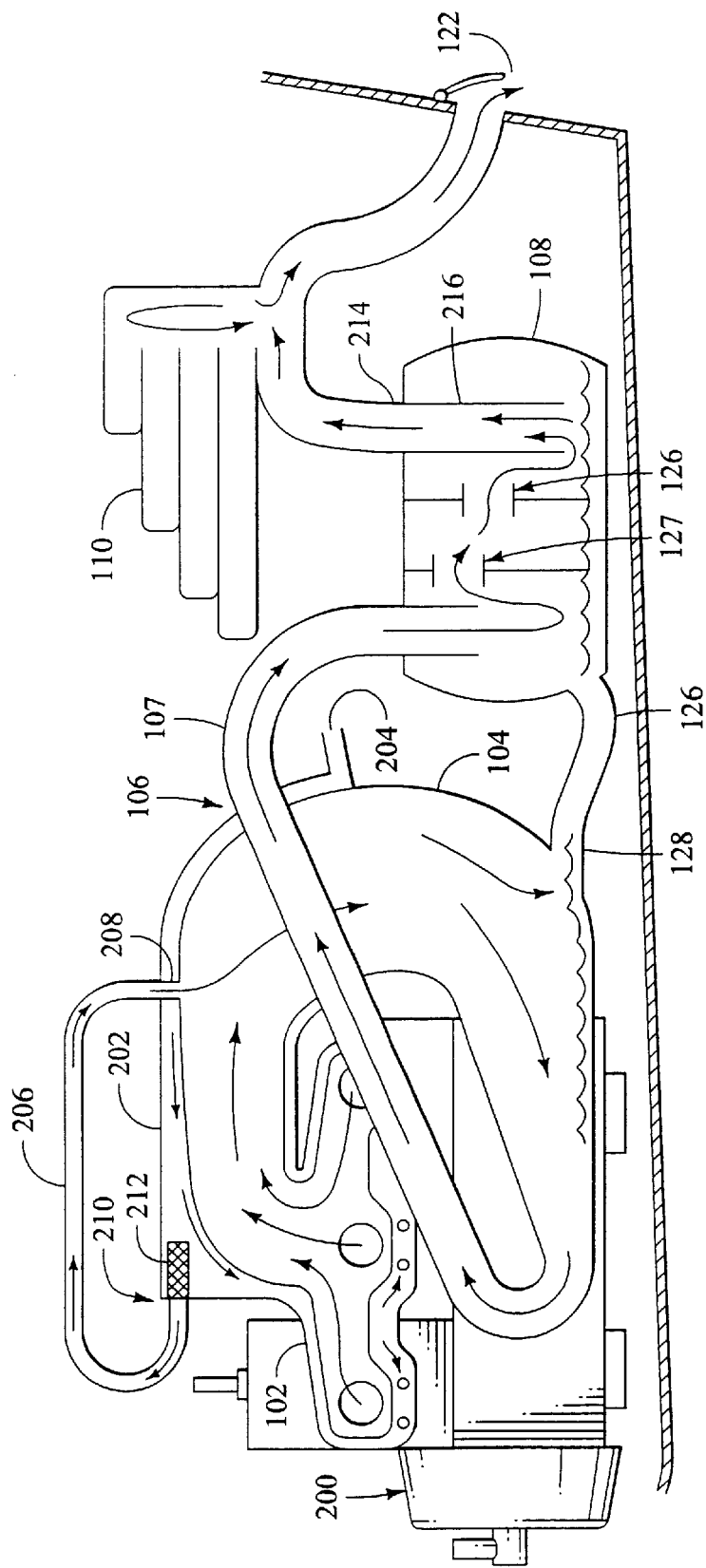
FIG. 3 is a schematic view of the exhaust system according to a preferred embodiment of the invention, not drawn to scale, showing exhaust flow through the system.

FIG. 2 is a perspective view of the exhaust system 100 shown in the hull of a personal watercraft with the deck removed according to a preferred embodiment of the present invention. The exhaust system 100 includes an exhaust manifold 102 that is coupled to an engine (see 200, FIGS. 3 and 4). Also, the exhaust system 100 includes an exhaust pipe 104, a first connector sleeve 106, an expansion chamber 108, a second connector sleeve 120, a resonator 110, a third connector sleeve 124 and an exhaust port 122. The first connector sleeve 106 is located between the exhaust pipe 104 and the expansion chamber 108. More particularly, the first connector sleeve 106 has a proximal end 112 coupled to a first output 116 of the exhaust pipe 104 and a distal end 114 coupled to a first input 118 of the expansion chamber 108. The resonator 110 and expansion chamber 108 are coupled together by a second connector sleeve 120. The resonator 110 is coupled to an exhaust port (122, FIGS. 3 and 4) by a third connector sleeve 124. The first connector sleeve extends from the first output generally upwardly over the exhaust pipe to a point disposed about level with a top of the engine and from that point downwardly to the first input if the expansion chamber. As can be seen in FIG. 3, the first output of the exhaust pipe is located at a point disposed about level with a bottom of the engine. In addition, the first output of the exhaust pipe is located at a point lower than the first input of the expansion chamber. The first connector sleeve has a maximum height that is located higher than the exhaust port.

A water drain conduit 126 is coupled between the exhaust pipe 104 and the expansion chamber 108. More particularly, the water drain conduit 126 has a proximal end 128 coupled to a second output 130 of the exhaust pipe 104 and a distal end 132 coupled to a second input 134 of the expansion chamber 108. The second input 134 of the expansion chamber 108 is located below the first input 18 of the expansion chamber 108 and the second output 130 of the exhaust pipe 104 is located below the first output 116 of the exhaust pipe 104. The water drain conduit may be made of metal or a plastic-type material and it may be rigid or flexible. In a preferred embodiment, the water drain conduit has an inner diameter ranging from about 0.5 inches to about 1.5 inches. In a preferred embodiment the ratio of inner diameters of the water drain conduit 126 and first connector sleeve 106 is about 1:4.

FIG. 3 is a schematic view of the exhaust system according to a preferred embodiment of the present invention, not drawn to scale, showing exhaust flow through the system. The engine 200 is coupled to the exhaust pipe 104 by exhaust manifold 102. In a preferred embodiment, part of the exhaust pipe 104 and manifold are cooled by a water jacket 202. The water jacket 202 has an input 204 that is coupled to a jet pump (not shown). The water jacket 202 includes a conduit 206 that couples part of the water jacket 202 to an input 208 in the exhaust pipe 104. More particularly, the conduit 206 in coupled to the water jacket 202 at location 210 where there is a filter screen 212. The flow of the exhaust gases through the exhaust system 100 and the water in the water jacket are shown by the arrows.

The operation of the exhaust system 100 will now be described. Exhaust flows from the cylinders (not shown) of the engine 200 to the exhaust manifold 102 and from the exhaust manifold 102 to the exhaust pipe 104. The exhaust flows from the exhaust pipe 104 to the expansion chamber 108 and through the expansion chamber 108 to the resonator 10 and out the rear of the vehicle through the exhaust port 122.

Water is injected into the water jacket 202 at input 204 and is eventually injected in the exhaust pipe at input 208 to reduce the gas temperature and reduce noise. Water is pumped into the water jacket 202 through input 204 from the jet pump (not shown). A portion of the cooling water in the water jacket 202 is diverted by conduit 206. The water flows through the conduit 206 and is injected inside the exhaust pipe 104 at input 208. The water cools the exhaust gas from a temperature of about 1,000 degrees Fahrenheit to about 150–200 degrees Fahrenheit. This reduces the heat in the gas before it reaches the portion of the exhaust pipe 104, first connector sleeve 106 and expansion chamber 108 that are not water jacketed. At high speed, the water is carried with the exhaust gas through the exhaust system 100. At low speeds water collects in the bottom of the exhaust pipe 104.

The water drain conduit 126 allows the water to drain from the exhaust pipe 104 to the expansion chamber 108. Water collects in the expansion chamber 108. The expansion chamber contains baffles 127 which inhibit water from passing back through the engine exhaust system 100 into the engine. The expansion chamber 108 has an output 214.

Extending into the expansion chamber 108 at output 214 is a pipe 216. When the water level in the expansion chamber 108 rises to the bottom edge of the pipe 216, the water is then blown up the pipe 216 and out the rear of the boat with the exhaust through the exhaust port 122. Without the water drain conduit 126, water would accumulate in the exhaust pipe 104 at low speeds. When water accumulates in the exhaust pipe 104, it reduces the rate of acceleration when the engine throttle is opened and makes for a greater risk of water getting inside the engine should the vehicle be overturned.

Figure 4:
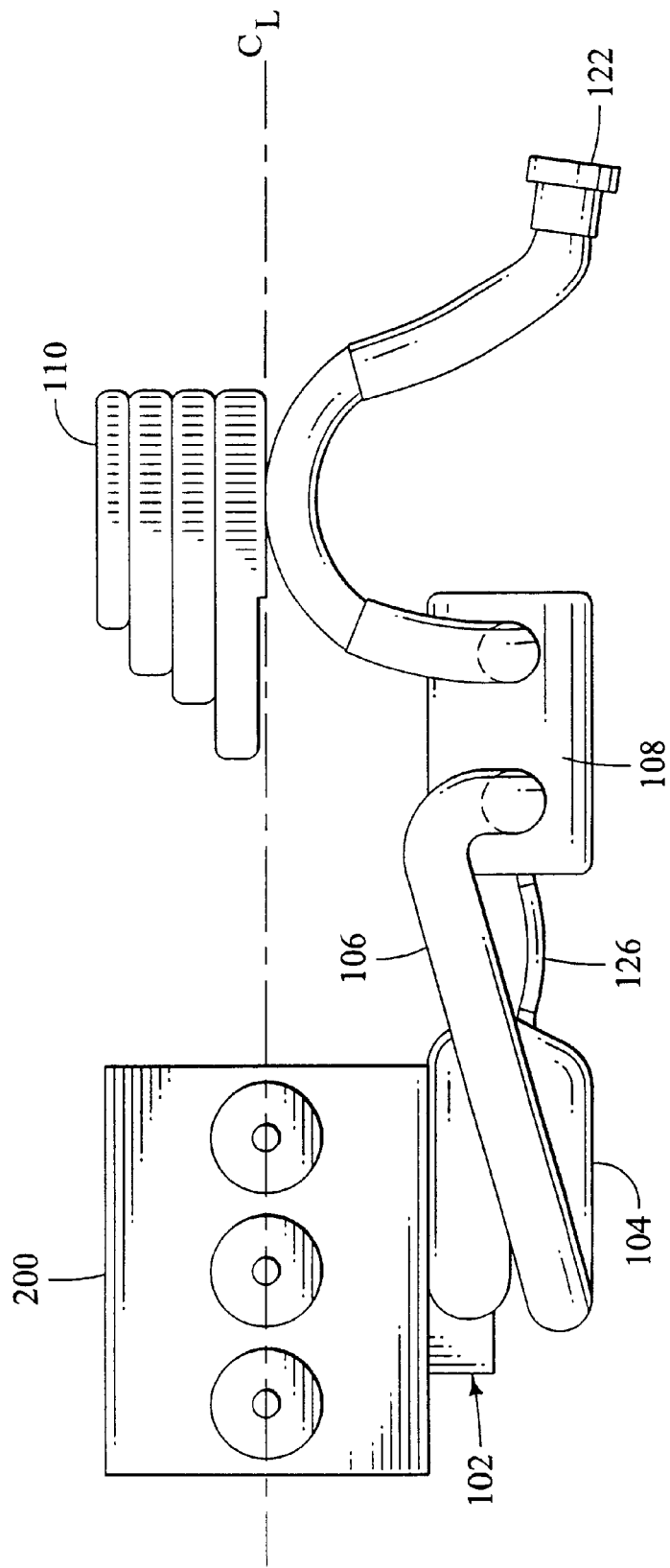
FIG. 4 is a top schematic view of the exhaust system shown in FIGS. 2–3.

FIG. 4 is a top schematic view of the exhaust system shown in FIGS. 2–3. The location of the various components are shown with respect to the center line of the craft. It can be seen that the exhaust pipe 104, first connector sleeve 106, expansion chamber 108, second connector sleeve 120, third connector sleeve 124 and exhaust port 122 are all located on a first side of the centerline of the craft. The resonator 110 is located on a second side of the centerline opposite the first side. The engine 200 is located on both the first and second sides of the centerline.

By locating a majority of the exhaust system's components on one side of the centerline of the hull, the exhaust system can be packed in a tight space and thus the exhaust system occupies less hull space. In addition, the layout of the exhaust system provides for a compact configuration and it does not require connector sleeves and components crossing back and forth across the centerline of the hull. In addition, the configuration of the exhaust pipe and first connector sleeve help maintain the level of power needed for successful operation of the personal watercraft. Furthermore, the configuration of the first connector sleeve 106 provides a trap 107 that helps protect the engine from backflow even when the watercraft is inverted. By placing the output of the exhaust pipe 104 away from the expansion chamber 108, the first connector sleeve 106 can reach the desired height while the separation between the exhaust pipe 104 and expansion chamber 108 remains small.

As can be seen the expansion chamber 108 is located downstream of the exhaust pipe 104 and the resonator 110 is located downstream of the expansion chamber 108.

While a personal watercraft has been described as a preferred vehicle, it will be recognized that the exhaust system according to the preferred embodiments of the present invention may be used in other types of vehicles such as snowmobiles, ATVs, for example, especially where the size and configuration of the engine compartment is a concern.

The above specification provides a complete description of the manufacture and use of the invention. Since many embodiments of the invention can be made without departing from the spirit and scope of the invention, the invention reside in the claims hereinafter appended.

What is claimed is:

1. A drainage system for a watercraft vehicle, the system comprising:
    an exhaust pipe;
    an expansion chamber;
    a connector sleeve located between the exhaust pipe and the exhaust chamber, the connector sleeve having a proximal end coupled to a first output of the exhaust pipe and a distal end coupled to a first input of the expansion chamber; and
    a water drain conduit located between the exhaust pipe and the exhaust chamber, the water drain conduit having a proximal end coupled to a second output of the exhaust pipe and a distal end coupled to a second input of the expansion chamber wherein the second input of the expansion chamber is located below the first input of the expansion chamber and the second output of the exhaust pipe is located below the first output of the exhaust pipe.

2. A system according to claim 1 wherein the expansion chamber is located downstream of the exhaust pipe.

3. A system according to claim 1 wherein the water drain conduit has an inner diameter ranging from about 0.5 inches to about 1.5 inches.

4. A system according to claim 3 wherein the connector sleeve has an inner diameter ranging from about 2 inches to about 6 inches.

5. A system according to claim 1 wherein the water drain conduit has an inner diameter and the connector sleeve has an inner diameter, the inner diameter of the water drain conduit and the inner diameter of the connector sleeve having a ratio of about 1:4.

6. A system according to claim 1 wherein the water drain conduit is a pipe.

7. A system according to claim 1 wherein the water drain conduit is a metal pipe.

8. A system according to claim 1 wherein the water vehicle is a personal watercraft.

9. A drainage system for a water vehicle, the system comprising:
    an exhaust pipe;
    an expansion chamber;
    a connector sleeve located between the exhaust pipe and the exhaust chamber, the connector sleeve having a proximal end coupled to a first output of the exhaust pipe and a distal end coupled to a first input of the expansion chamber; and
    means located between the exhaust pipe and the exhaust chamber for draining water from the exhaust pipe.

10. A system according to claim 9 wherein the means for draining comprises a water drain conduit having a proximal end coupled to a second output of the exhaust pipe and a distal end coupled to a second input of the expansion chamber wherein the second input of the expansion chamber is located below the first input of the expansion chamber and the second output of the exhaust pipe is located below the first output of the exhaust pipe.

11. A system according to claim 9 wherein the expansion chamber is located downstream of the exhaust pipe.

12. A system according to claim 9 wherein the water drain conduit has an inner diameter ranging from about 0.5 inches to about 1.5 inches.

13. A system according to claim 12 wherein e connector sleeve has an inner diameter ranging from about 2 inches to about 6 inches.

14. A system according to claim 9 wherein the water drain conduit has an inner diameter and the connector sleeve has an inner diameter, the inner diameter of the water drain conduit and the inner diameter of the connector sleeve having a ratio of 1:4.

15. A system according to claim 9 wherein the water drain conduit is a pipe.

16. A system according to claim 9 wherein the water drain conduit is a flexible conduit.

17. A system according to claim 9 wherein the water vehicle is a personal watercraft.

18. A personal watercraft comprising:
    a hull including a bottom hull and a top deck secured over the bottom hull, the hull defining an engine compartment sized to contain an internal combustion engine for powering a jet propulsion unit, the jet propulsion unit including a steerable water discharge nozzle, the top deck having a raised, longitudinally extending seat adapted to accommodate an operator in straddle fashion; an exhaust system located in the engine compartment comprising:

an exhaust pipe;

an expansion chamber;

a connector sleeve located between the exhaust pipe and the exhaust chamber, the connector sleeve having a proximal end coupled to a first output of the exhaust pipe and a distal end coupled to a first input of the expansion chamber; and a water drain conduit located between the exhaust pipe and the exhaust chamber, the water drain conduit having a proximal end coupled to a second output of the exhaust pipe and a distal end coupled to a second input of the expansion chamber wherein the second input of the expansion chamber is located below the first input of the expansion chamber and the second output of the exhaust pipe is located below the first output of the exhaust pipe.

19. A system according to claim 18 wherein the expansion chamber is located downstream of the exhaust pipe.

20. A system according to claim 18 wherein the water drain conduit has an inner diameter ranging from about 0.5 inches to about 1.5 inches.

21. A system according to claim 20 wherein the connector sleeve has an inner diameter ranging from about 2 inches to about 6 inches.

22. A system according to claim 18 wherein the water drain conduit has an inner diameter and the connector sleeve has an inner diameter, the inner diameter of the water drain conduit and the inner diameter of the connector sleeve having a ratio of 1:4.

23. A system according to claim 18 wherein the water drain conduit is a pipe.

24. A system according to claim 18 wherein the water drain conduit is a flexible conduit.

* * * * *